United States Patent [19]

Davis et al.

[11] Patent Number: 5,094,752

[45] Date of Patent: * Mar. 10, 1992

[54] AEROBIC WASTEWATER TREATMENT WITH ALKALINITY CONTROL

[75] Inventors: H. Forbes Davis; James P. Harshman, both of Tallevast, Fla.

[73] Assignee: Davis Water & Waste Industries, Inc., Tallevast, Fla.

[*] Notice: The portion of the term of this patent subsequent to May 7, 2008 has been disclaimed.

[21] Appl. No.: 629,622

[22] Filed: Dec. 18, 1990

Related U.S. Application Data

[63] Continuation-in-part of Ser. No. 479,150, Feb. 9, 1990, Pat. No. 5,013,442.

[51] Int. Cl.⁵ .............................................. C02F 3/12
[52] U.S. Cl. ................................ 210/614; 210/620; 210/739
[58] Field of Search ............... 210/614, 620, 626, 739, 210/743, 96.1, 143, 202, 259

[56] References Cited

U.S. PATENT DOCUMENTS

| | | | |
|---|---|---|---|
| 3,654,147 | 4/1972 | Levin et al. | 210/903 |
| 4,011,156 | 3/1977 | Dubach et al. | 210/626 |
| 4,116,834 | 9/1978 | King | 210/96 |
| 4,277,343 | 7/1981 | Paz | 210/614 |
| 5,013,442 | 5/1991 | Davis et al. | 210/614 |

FOREIGN PATENT DOCUMENTS

| | | |
|---|---|---|
| 0288961 | 4/1988 | European Pat. Off. |
| 62-18238 | of 1987 | Japan |
| 1-130790 | 5/1989 | Japan |
| 1-130791 | 5/1989 | Japan |

OTHER PUBLICATIONS

"Wastewater Treatment-An Award-Winning System", 488 Hydrocarbon Processing, vol. 62 (1983) Oct., No. 10, Houston, Tex.

Chemical Abstracts, vol. 107, No. 18, Nov. 1, 1987, Columbus, Ohio, Van Haandel et al., "Alkalinity and pH Changes in the Activated . . . ", p. 424; left-hand column.

Journal WPCF, vol. 58, No. 5, "Improved Alkalimetric Monitoring for Anaerobic Digestion . . . ", Ripley et al., May, 1986, pp. 406–411.

Primary Examiner—Stanley S. Silverman
Assistant Examiner—Christopher Upton
Attorney, Agent, or Firm—Nixon & Vanderhye

[57] ABSTRACT

Aerobic wastewater treatment processes are controlled utilizing alkalinity measurements. A base line of alkalinity is determined by measuring the alkalinity profile of the influent to the aerobic wastewater treatment process. The alkalinity of the wastewater is sensed at a number of different points in the aerobic wastewater treatment process, such as at a clarifier effluent and sludge exit, aeration zone, and aerobic digester effluent. When the sensed alkalinity at any given point is above a predetermined amount over base line alkalinity, the air supply is increased and/or the concentration of microbes and food is reduced (as by increasing the sludge withdrawal rate from a clarifier) until the sensed alkaline level is stabilized. When the sensed alkalinity is below a predetermined amount under base line, the air supply is decreased and/or the concentration of feed and microbes increased (as by reducing or terminating sludge withdrawal from a clarifier) until the sensed alkalinity level is stabilized. Anaerobic odors are eliminated, plant operation and efficiency is improved, settling is improved, there is enhanced removal from the secondary clarifier, and solids carryover is reduced increasing the quality of effluent from the clarifier.

17 Claims, 4 Drawing Sheets

ALKALINITY PROFILE

FOR A TYPICAL AEROBIC BIOLOGICAL PROCESS

AEROBIC WASTEWATER TREATMENT WITH ALKALINITY CONTROL

CROSS-REFERENCE TO RELATED APPLICATION

This application is a continuation-in-part of application Ser. No. 07/479,150, filed Feb. 9, 1990, now U.S. Pat. No. 5,013,442.

BACKGROUND AND SUMMARY OF THE INVENTION

This invention relates to a process and apparatus for continuously monitoring biological reactions in domestic or industrial wastewater treatment plants. The successful operation of wastewater treatment facilities depends on close operational control over the entire process. Key to the required high degree of control lies in analysis of every step of the operation and every piece of equipment in the treatment plant, complementing the in-depth process technology to assure proper balance of chemical/mechanical interactions and/or their changes resulting from variations in influent quality or weather conditions. Such a scientific approach to everyday procedures, frequently ignored by municipalities due to lack of trained operators, permits valid comparisons with similar processes operated at other locations.

Process analysis involves breaking down the treatment operation into its component steps. Data bases of each step, taking into account the influent composition and flow rate, the plant configuration and size, and the operating efficiency of each piece of equipment, can define optimum manpower productivity. Anomalous behavior can be recognized as soon as operating parameters move beyond acceptable guidelines. This immediate feedback can precipitate fast corrective action to prevent unacceptable discharges which exceed compliance limits due to plant upsets or other causes. By automating mechanical operations, the possibility of human error in the process can be reduced. But more importantly, continuous data can provide a greater degree of sensitivity permitting control of processes and equipment. Having the ability to react quickly and precisely to minute process variations can afford a delicate, controlled balance to the overall operation.

This invention involves process analysis of the treatment of domestic and industrial wastewater. To promote aerobic biological processes, oxygen is added by aeration, trickling filters, rotating biological discs, pure oxygen gas, or other oxygen dispensing systems. The microbial use of available oxygen causes changes in the level of alkalinity. "Alkalinity" is defined as the ability to buffer acids determined by titrating with sulfuric acid to a select end point of 4.5 pH. (Note: pH is defined as the negative logarithm of the effective hydrogen-ion concentration or activity in gram equivalents per liter. It is used in expressing both acid and base activity where a value of 7 represents neutrality, values less than 7 are increasingly acidic and values greater than 7 increasingly alkaline.)

Alkalinity in sewage (wastewater) is due to the presence of hydroxides, carbonates, and bicarbonates of elements such as calcium, magnesium, sodium, potassium, or of ammonia and amines. Of these, bicarbonates are most common. Sewage is normally alkaline, receiving its alkalinity from the water supply, the ground water, and the materials added during domestic usage.

Alkalinity also may be viewed as the measure of the capacity of water to absorb hydrogen ions without significant pH change (i.e. to neutralize acids).

The hydrogen ion activity (i.e. intensity of the acid or alkaline condition of a solution) is referenced by the term pH, which is defined as: $pH = \log 1/(H^+)$. Water dissociates to only a slight degree, yielding hydrogen ions equal to $10^{-7}$ mole/L, thus pure water has a pH of 7. It is also neutral since $10^{-7}$ mole/L of hydroxide ion is produced simultaneously ($H_2O \rightarrow H^+ + OH^-$)

When an acid is added to water the hydrogen ion concentration increases, resulting in a lower pH value. Addition of an alkali can reduce the number of free hydrogen ions, causing an increase in pH because $OH^-$ ions unite with $H^+$ ions. The pH scale is acidic below 7 and basic above 7. Below pH 4.5, dissolved $CO_2$ predominates over bicarbonates ($HCO_3^-$) in solution, thus by our definition, no alkalinity exists. Between pH 4.5 and 8.3, bicarbonate ions ($HCO_3^-$) predominate. Above 8.3, the bicarbonates are dominated by carbonate ions ($CO_3^{2-}$). Hydroxide appears at a pH greater than 9.5 and reacts with $CO_2$ to yield both bicarbonates and carbonates.

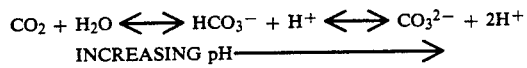
$$CO_2 + H_2O \longleftrightarrow HCO_3^- + H^+ \longleftrightarrow CO_3^{2-} + 2H^+$$
INCREASING pH —————→

The alkalinity of water may be due to one or more of the following ionic forms; $OH^-$ (hydroxide), $CO_3^{2-}$ (carbonates) and $HCO_3^-$ (bicarbonate). For commonality the concentrations of these various radicals are given as mg of $CaCO_3/L$.

In wastewater treatment, pH must be maintained in a range favorable for biological activity. Observation and testing has demonstrated that this pH range is 6.5 to 8.0, with optimum activity between 6.7 and 7.3. Within this pH range a change of 0.3 pH units may result in a change of the alkalinity level by 200 mg/L or more. Because of the greater magnitude of alkalinity change, and its linearity as compared to pH, the measurement of alkalinity is more reliably monitored than pH and changes are more easily recognized, thus permitting quicker reaction on the part of the operators to adjust biological process activity to normal levels.

It has been clearly demonstrated that while operators may not react to a small change in pH, they will react to a broad alkalinity change. A broad swing of alkalinity level can occur during a period when the change in pH is only 0.1 to 0.3.

When titrating to an end point of 4.5, there is reason to believe that below a pH of 5.5, much of the alkalinity will result from insoluble bases as they go into solution. There is some doubt that insoluble bases are involved in the biological process, therefore, a lower pH end point below 5.75 may not necessarily need to be considered in establishing this alkalinity relationship. Similar results can be obtained by filtering the samples prior to analysis.

The major source of alkalinity in most wastewater treatment processes is the level of $CO_2$ and $NH_3$ (basic ammonia) present in the system. Excess aeration results in an increase in acid production (as $CO_2$) and in increased nitrification which reduces the level of ammonia. Both acid production and ammonia removal cause a drop in alkalinity. A significant drop in alkalinity can be remedied by reducing the oxygen supply and/or increasing the solids level (i.e. concentration and feed of microbes). An increase in alkalinity is usually associated with an increase in ammonia. The alkalinity can be reduced by increasing the oxygen supply and/or reducing the solids level. Adjusting the oxygen supply in response to a change in alkalinity is the easiest, quickest and most logical method of bringing the biological activity back into balance. Adjusting the solids concentration (e.g. mixed liquor suspended solids (hereafter "MLSS"), or return activated sludge (hereafter "RAS") requires adjusting the volume and detention times, thus it is the secondary response to an alkalinity change.

Flows into wastewater plants vary daily and hourly but on a consistent basis. Normally, at about 0600 hours each day, flow begins to increase and at about 2200 hours, begins to drop. There may be smaller regular deviations in a particular collection system. Using the alkalinity level of the raw sewage as a base line, a 24-hour alkalinity profile of the treatment process can be quickly established.

There is a dramatic change in alkalinity immediately after discharge or mixing of raw sewage into the first biological process tank, such as aerated grit removal tanks, flow equalization tanks, primary settling tanks, aeration tanks or flow mixing tanks from side stream return. This change in alkalinity is caused by dilution so process alkalinity monitoring of base line may begin at start of first dilution area or biological process zone.

Once a 24 hour flow profile has been established, a change in alkalinity will indicate the need to increase or decrease the oxygen supply or solids inventory. This may be programmed into the system or be dependent upon operator functioning. Using this monitoring process can result in energy savings and a consistent improvement in effluent quality.

The alkalinity is continually changing in each of the aerobic or anaerobic process areas, including primary clarifier, aeration basin, secondary clarifier, sludge return, and digester. The rate of the biological processes occurring within the treatment system is dependent on a number of factors, including the supply of dissolved oxygen, the solids concentration, the degree of mixing and the temperature. Changes in biological activity produce changes in alkalinity levels, while the change in other parameters, such as pH, may be negligible.

The changes in alkalinity levels can occur rapidly and over a relatively wide range, indicating to the operator that operational changes need to be made before the normal profile of the process system is upset. The operator may make the necessary operational changes by manually adjusting the oxygen supply and/or pump speeds. Through the use of a programmed process control system, integrating pumps and air supplies with the monitor information, the adjustments can be made automatically to provide continuous control and real time reactions to the situation.

An increase in alkalinity indicates a shift in the biological activity which can be remedied by increasing the dissolved oxygen, decreasing the solids concentration, or both. A decrease in alkalinity indicates excess oxygen, nitrification, or an insufficient biological mass.

According to one aspect of the present invention there is provided a method of controlling an aerobic wastewater process, having an influent of wastewater to the process and an effluent of treated water from the process. The method comprises the following steps: (a) Determining a baseline of alkalinity by measuring the alkalinity profile of the influent wastewater to the aerobic wastewater treatment process. (b) Sensing the alkalinity of the wastewater being treated at a plurality of different points in the aerobic wastewater treatment process. (c) When sensed alkalinity from step (b) is above a predetermined amount over baseline alkalinity and on the basis of the alkalinity sensing alone, independent of dissolved oxygen sensing, increasing air supply and/or reducing concentration of microbes in foods until the sensed alkalinity level is within the predetermined amount over baseline; and (d) when the sensed alkalinity from step (b) is below a predetermined amount under baseline alkalinity, and on the basis of the alkalinity sensing alone, independent of dissolved oxygen sensing, decreasing air supply and/or increasing the concentration of food and microbes, until the sensed alkalinity level is within a predetermined amount under baseline. Efficient treatment of wastewater to produce treated effluent without the addition of outside alkalinity adjusting chemicals or additives is thus accomplished.

In the aerobic treatment of wastewater in which oxygen is supplied to microbes and feed, the invention comprises a method of maintaining alkalinity within a predetermined range so as to maintain the pH of the wastewater between about 6.5–8.0 (preferably 6.7–7.3) during treatment. The method steps are: (a) sensing the alkalinity of the wastewater at a plurality of points in the aerobic treatment of the wastewater; and (b) adjusting the alkalinity adjacent these points so that it is within about 100 mg $CaCO_3$/L of a desired value by changing the rate of oxygen supply and/or the concentration of microbes and feed, so as to control alkalinity to maintain pH within the desired range without the addition of chemicals or additives.

The invention also contemplates an apparatus for controlling an aerobic wastewater treatment process, which process includes a clarifier, aerobic treatment zone, and digester. The apparatus comprises: A plurality of alkalinity sensors, at least one associated with each of the clarifier, aerobic treatment zone and digester. Means for supplying oxygen to the aerobic treatment zone and digester, and means for withdrawing sludge from the clarifier. And, control means (i.e., a computer interface) for controlling the oxygen supply and sludge withdrawal in response to the alkalinity sensors.

The benefits to be derived from the method and apparatus of continuously monitoring and reacting to changes in the alkalinity level according to the invention have been clearly demonstrated. The data collected in test programs has provided convincing evidence that monitoring the change in the levels of alkalinity can be a very reliable indicator of change in microbial activity, thereby becoming a valuable tool for operators to utilize in making early process control changes to prevent process upset, instead of responding to an upset situation once it has occurred.

The increased process efficiency, with relatively little operator involvement, also improves sludge thickening by enhanced supernating in the digester. The end result is reductions in operating costs and odor control problems, while insuring a stabilized effluent quality. Further, automatic programming can reduce a plant's manpower requirements.

It is the primary object of the present invention to provide efficient control of an aerobic wastewater treatment process by sensing and maintaining an alkalinity level. This and other objects of the invention will become clear from an inspection of the detailed description of the invention, and from the appended claims.

DETAILED DESCRIPTION OF THE DRAWINGS

Figure 1:
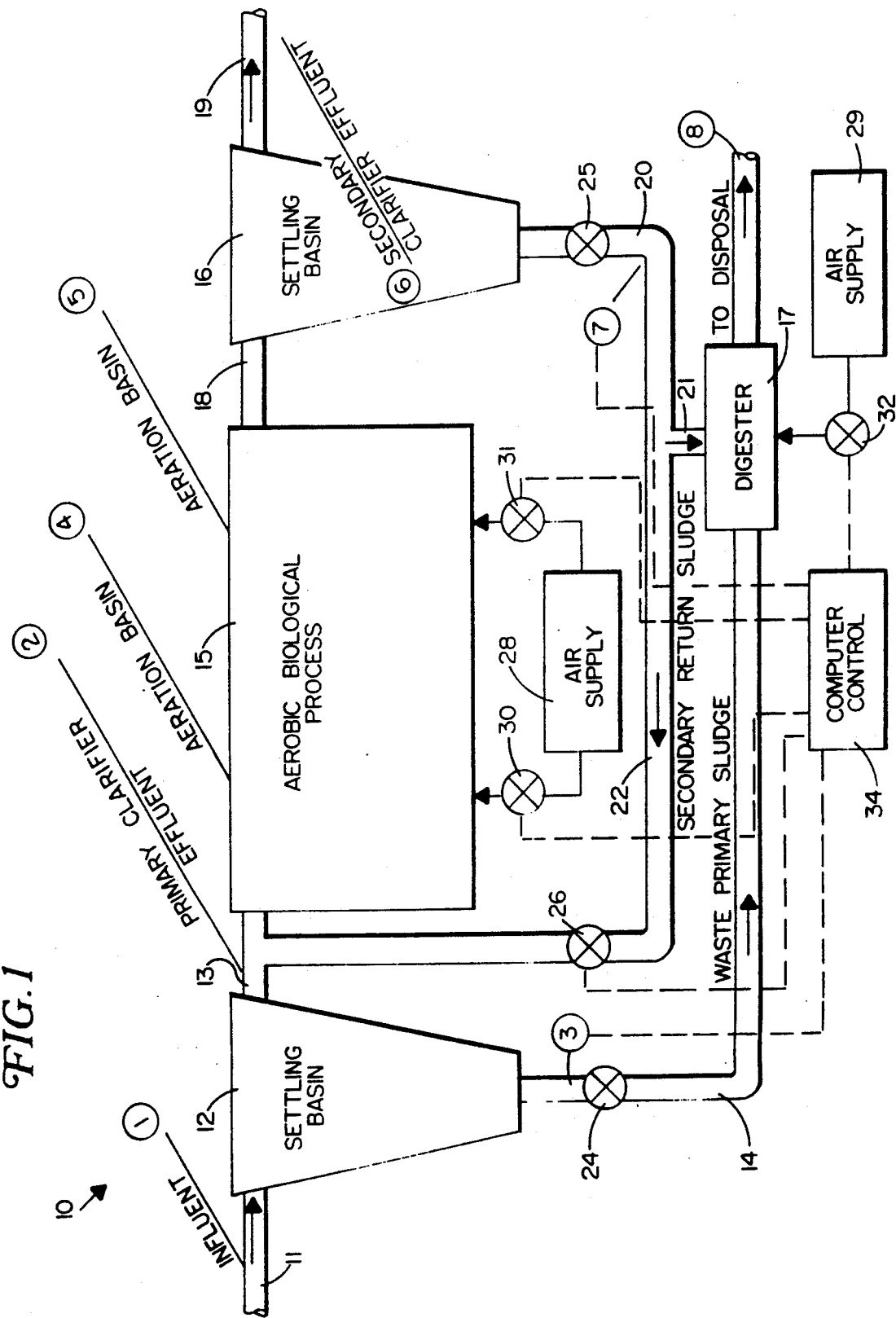
FIG. 1 is an overall schematic diagram of an exemplary biological process in a typical aerobic/anaerobic waste treatment plant with monitoring points referenced.

A exemplary apparatus for controlling an aerobic wastewater treatment process is illustrated generally by reference numeral 10 in FIG. 1. A wastewater treatment process schematically illustrated in FIG. 1 utilizes an influent conduit 11, a first clarifier (settling base) 12, which acts as a primary clarifier, a primary clarifier effluent line 13 and a primary clarifier sludge line 14, an aerobic treatment zone such as the aerobic tank 15, a secondary clarifier 16, and a digester 17. The primary clarifier effluent 13 leads to the aerobic tank 15, and the discharge from the aerobic tank 15 is through conduit 18 to the secondary clarifier 16. There is a secondary clarifier effluent line 19, and a secondary clarifier sludge line 20. Line 20 leads through branch 21 to the digester 17, and through branch 22 back to the aerobic tank 15. A sludge line 14 is also connected to the digester 17.

Various air supplies and control mechanisms, such as pumps or valves, are provided for the various components. For example, a control valve or pump 24 is provided in the sludge line 14, and a valve or pump 25 is provided in the line 20. Similarly, a valve or pump 26 may be provided in the branch conduit 22. One or more air supplies 28, 29, are provided, air supply 28 supplying the air through pumps or valves 30, 31, to various portions of the aerobic tank 15, while the air supply 29 supplies air through valve or pump 32 to the digester 17. Control means, such as a computer control 34, controls all of the components. The specific oxygen adding components may be aerators, trickling filters, rotating discs, or the like.

The encircled numbers illustrated in FIG. 1 are a plurality of alkalinity sensors, or sensing points. Sensor 1 is in the effluent line 11, sensor 2 in the primary clarifier effluent line 13, sensor 3 in the waste primary sludge line 14, sensor 4 approximately 30% (by length or time) into the aeration zone in the tank 15, sensor 5 at approximately 100% of the aeration zone (length or time), sensor 6 at the secondary clarifier effluent line 19, sensor 7 at the secondary clarifier sludge return line 20, and sensor 8 at the digester 17 effluent. Each of the sensors can comprise any suitable type of conventional alkalinity sensor, such as a titrant device, samples collected from each of the points 1-8 being collected, filtered and pumped to a control monitor (e.g. at computer control 34) where the monitor transmits the alkalinity information to a visual readout and/or a printed graph for operator response, or automatically effects computer control of the parameters. Typical equipment for control and transmission may include an Orion model #1720 equipment unit. The sensors sense alkalinity alone —i.e., they are independent of dissolved oxygen sensing.

The level of alkalinity variation before a process control function or piece of equipment is initiated, varies from point to point in the treatment process. However, for effective operation to insure maintenance of the pH of the wastewater treatment system within a desired range of 6.5-8.0 (preferably 6.7-7.3), variation of alkalinity from the baseline should not be allowed to be greater than about 100 mg $CaCO_3$/L at any time.

For the exemplary embodiment illustrated in FIG. 1, the alkalinity sensor 1 determines the baseline against which all subsequent alkalinity determinations are compared. The baseline is preferably determined over about a 24 hour period. Depending upon the particular domestic or industrial system with which the system is utilized, the baseline value may vary depending upon the time of day.

Alkalinity sensors 2 and 3 are at the primary clarifier effluent and primary clarifier sludge conduit, respectively. For each of the sensors, when the alkalinity level reaches +15 (that is 15 mg $CaCO_3$/L greater than the influent level—that is the baseline level) the sludge withdrawal rate must be increased, by increasing the size of the opening in the valve 24 or the speed of operation of the pump 24. When the alkalinity level at points 2 or 3 drops to −10 mg/L with respect to the baseline, the sludge withdrawal rate must be reduced until the alkalinity level stabilizes. Of course, reduction in the sludge withdrawal rate is accomplished by slowing down the pump 24 or reducing the size of the opening in the valve 24.

At the first alkalinity sensor 4 in the aeration zone 15 (at 30% of aeration zone length or time), when the alkalinity level reaches +10 relative to baseline, the air supply must be increased or the MLSS concentration must be reduced, or both, until the alkalinity level stabilizes. The air supply is increased by controlling valve or pump 30 to increase air addition, and the MLSS may be reduced by controlling valve or pump 26 to reduce the amount of MLSS recirculated to the zone 15. It the alkalinity sensed by sensor 4 is −20 relative to baseline, the air supply must be decreased—by controlling pump or valve 30—until the level stabilizes.

By taking adequate corrective action at and adjacent alkalinity sensor 4, drastic action at alkalinity sensor 5 can be avoided, thereby preventing an upset of the process. At sensor 5, when the alkalinity level reaches +10 relative to baseline, the air supply must be increased (by controlling valve or pump 31) and/or the MLSS concentration reduced, until the alkalinity level stabilizes. When the alkalinity level reaches -60 relative to baseline at sensor 5, the air supply must be reduced and/or the MLSS concentration increased until the stabilization occurs.

Secondary clarifier 16 has alkalinity sensors 6, 7 at the secondary clarifier effluent 19 and sludge outlet 20, respectively. The same alkalinity differential at sensor 6 is provided for the secondary clarifier 16 as for the first clarifier 12 (at a level +15 relative to baseline, sludge withdrawal rate is increased by controlling valve or pump 25, and at −10 the sludge withdrawal rate is reduced or stopped until the alkalinity level stabilizes). For the alkalinity sensor 7, when alkalinity exceeds +30 relative to baseline sludge withdrawal rate is increased by controlling valve or pump 25, or at −10 it is reduced or stopped.

At the effluent for the aerobic digester 17, when the alkalinity sensor 8 senses an alkalinity level which exceeds +100 relative to baseline, decant is stopped and the air supply is increased, by controlling valve or pump 32, until the alkalinity level stabilizes. Also at −100 relative to baseline, the air supply is turned off by controlling valve or pump 32, and the sludge is permitted to settle and supernate.

Figure 2:
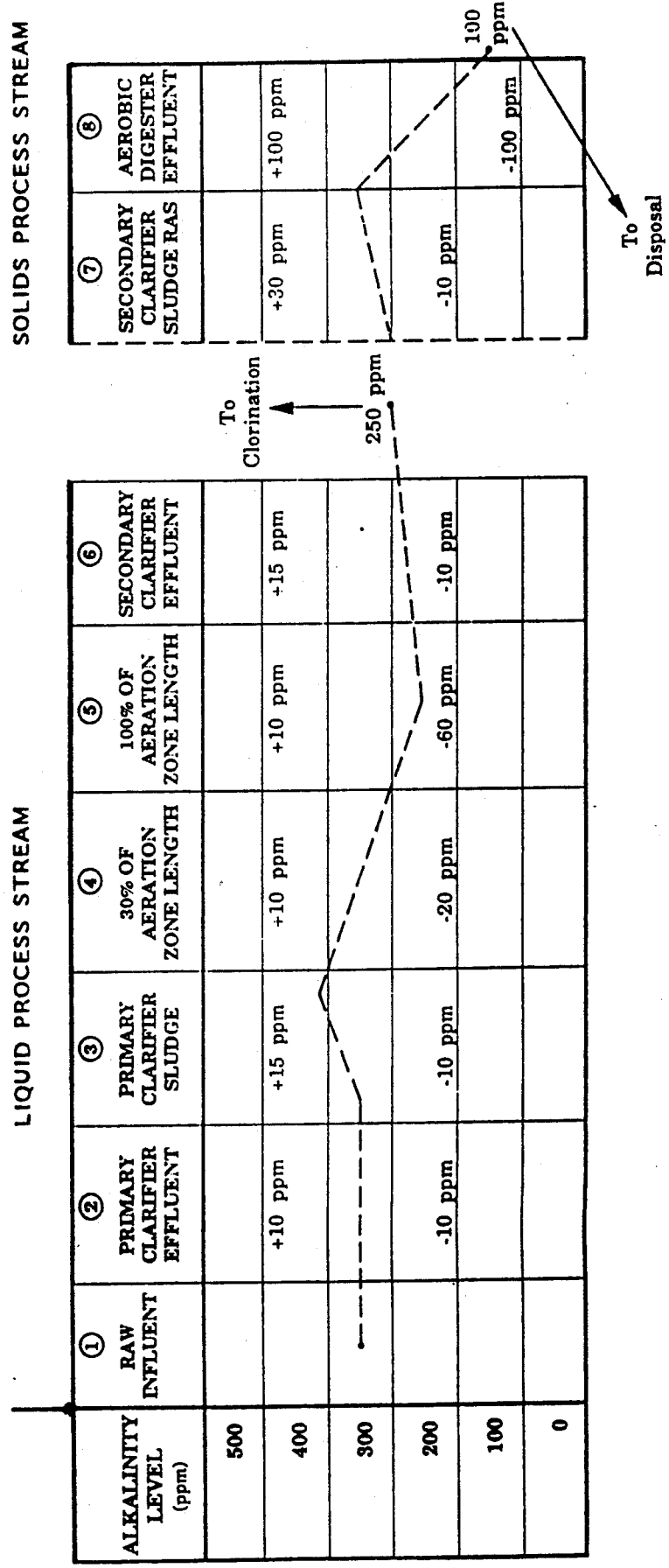
FIG. 2 is a graph depicting typical acceptable variations of levels of alkalinity throughout a typical process.

FIG. 2 illustrates an exemplary alkalinity level and deviations at various alkalinity sensors, providing a graphical representation of the verbal analysis provided above. Operated in this manner, the aerobic wastewater treatment system will continuously operate within the desired pH range (e.g. 6.7-7.3), and thereby have maximum efficiency. Primary sludge wasting is controlled and optimized, and aerobic odors are eliminated, solids carryover will be reduced and the quality of the effluent from the clarifier improved, and a marked reduction in organic volatile solids will be assured resulting in an optimallly efficient process.

A particular example of the effective operation of the method and apparatus according to the present invention will now be described with respect to a specific sewage treatment plant. The plant involved serves a bedroom community with little industrial flow contributions, treating an average of 3.2 million gallons of sewage per day. During peak tourist season there is an average of 4.6 million gallons per day, with wide fluctuation in flows with a high of 4.6 million gallons (average) between 7:30 and 9:00 a.m., and a low of 0.3 million gallons per day at 1:30 a.m.–6:00 a.m. It was standard practice to turn off the digester air supply for up to three days in an effort to supernate, and after the air was off for twelve hours there was little or no change in pH (typically about 6.9), although there was a large increase in alkalinity. In three days with no air supplied, the alkalinity level reached 800 parts per million and the sludge was malodorous. When the air was turned back on, the alkalinity decreased from 800 ppm to 520 ppm while the pH remained at 6.9, there was a marked reduction in odors.

EXAMPLE

Figure 3:
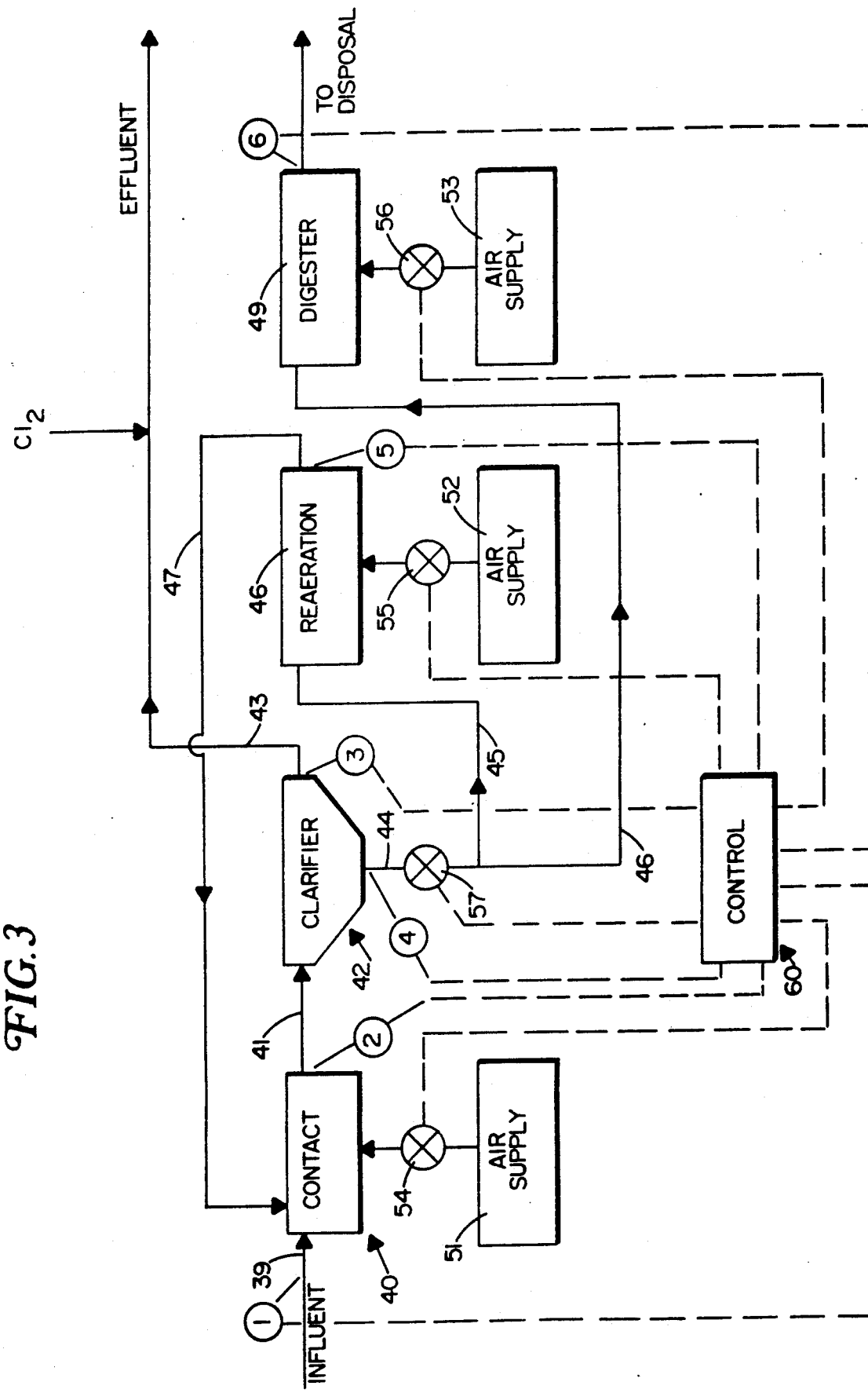
FIG. 3 is a schematic of another specific, aerobic wastewater treatment system.

The sewage treatment plant having the above parameters is illustrated schematically in FIG. 3, having an influent 39 to a contact zone 40, with a discharge 41 therefrom. The discharge 41 leads to a clarifier 42 having an effluent line 43, and a sludge line 44. The effluent in line 43 is chlorinated. The sludge in line 44 is split into two flows 45, 46. The flow 45 leads to a re-aeration zone 46, with effluent return via line 47 to contact zone 40. Line 46 leads to aerobic digester 49. Air supplies 51, 52, 53 are provided for the contact zone 40, re-aeration 46, and digester 49, respectively, with control valves or pumps 54, 55, and 56, respectively, associated with the air supplies 51 through 53. A control valve or pump 57 is provided in the sludge outlet 44 from clarifier 42. A common control—such as a computer control 60—controls all of the components and receives alkalinity sensing measurements from the sensors 1 through 6 (illustrated by numbers surrounded by circles) which are provided at the places indicated in the system.

Figure 4:
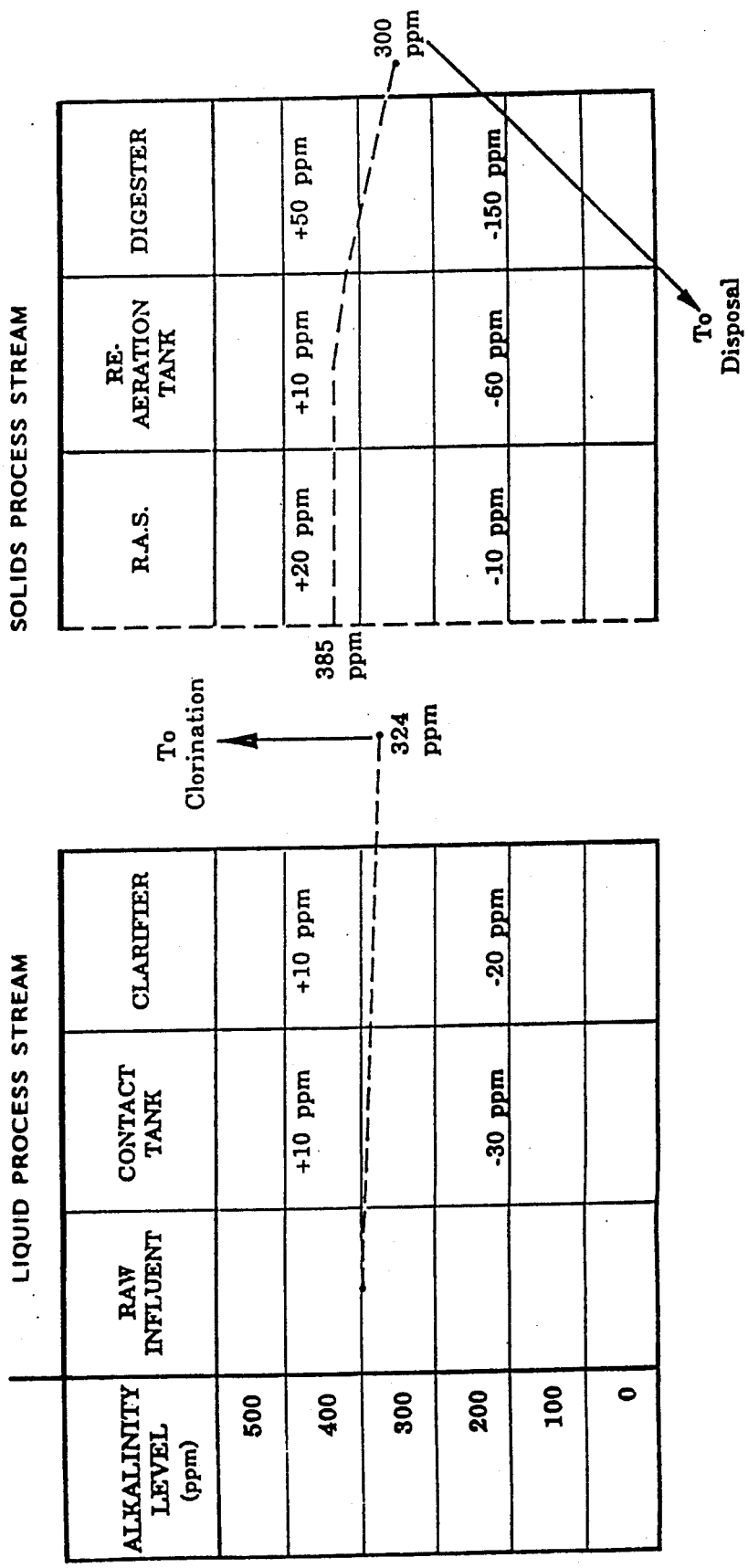
FIG. 4 is a graphical depiction of acceptable alkalinity variations of the system of FIG. 3.

A profile of the alkalinity levels throughout the process was first established, monitoring the alkalinity levels at numerous points throughout the system. Six ultimate monitoring points for effective operation were considered optimal, at the raw influent 1, contact zone effluent zone 2, clarifier effluent prior to chlorination 3, RAS 4, re-aeration effluent 5, and digester effluent 6. Observation of the alkalinity level changes over a 24 hour period allowed the development of graphs showing the mean alkalinity, established at the influent 1, and acceptable losses in alkalinity through the various points in the treatment process (i.e. the desirable levels were determined empirically). FIG. 4 illustrates a profile determined empirically.

The following Table I gives an analysis of alkalinity values during a typical operating week after practice of the invention. According to the invention, utilizing the alkalinity sensors 1 through 6, the air supply was changed by reducing or increasing the number of blowers turned on (e.g. 1, 2, or 3 blowers), by changing the MLSS concentration by increasing or decreasing the RAS rate and volume of sludge wasted to the digester, or practicing both of these techniques. The operators received a readout of the alkalinity levels at an Orion Model #1720 monitoring equipment unit, and manually adjusted the air supply, or RAS rate and volume, in response thereto.

TABLE I

| ALKALINITY LEVEL (PPM) AT MONITORING POINT | | | | | |
|---|---|---|---|---|---|
| Time of Sample | Raw Influent | Contact Tank | Clarifier | R.A.S. | Re-Aeration Tank | Digester |
| 0800 | 410 | 320 | 310 | 350 | 360 | 370 |
| 1700 | 380 | 350 | 340 | 360 | 370 | 290 |
| 0800 | 400 | 340 | 325 | 400 | 340 | 240 |
| 1700 | 360 | 375 | 330 | 400 | 320 | 125 |
| 0800 | 390 | 360 | 310 | 360 | 340 | 120 |
| 1600 | 390 | 360 | 320 | 380 | 300 | Super |
| 0800 | 390 | 320 | 320 | 380 | 300 | Super |
| 1600 | 390 | 360 | 310 | 420 | 300 | Super |
| 0800 | 390 | 350 | 330 | 380 | 350 | 580 |
| 1700 | 360 | 350 | 320 | 400 | 330 | 400 |
| 0900 | 330 | 310 | 300 | 370 | 310 | 360 |
| 1600 | 410 | 430 | 420 | 420 | 360 | 220 |
| AVG. | 383 | 352 | 324 | 385 | 330 | 300 |

Typical design parameters for the plant illustrated schematically in FIG. 3, and utilized in the practice of this example, are given in Table II. The design parameters are for each of two 1.5 million gallons per day plants.

TABLE II

| Monitoring Point | |
|---|---|
| | Retention Times/Capacities |
| Contact | 3 hours at ADF |
| Clarifier | 4 hours at ADF |
| Re-aeration | 6 hours at ADF |
| Sludge Return | Air lift to 100% of influent |
| Digester | 3 cubic feet per capita at 100 GPD |
| | 45,000 cubic feet (365,645 gallons) |
| | Other Design Features |
| Air Supply | 1,750 CFM per day per pound of BOD |
| BPD design | 200 ppm and 1.5 M.G.D. |
| | (2,502 pounds BOD per day) |

Effluent from these plants flow into a holding lagoon and then is pumped either to county-owned spray fields or an adjacent private golf course for irrigation. Waste sludge is hauled by contract in liquid form to land application. Air supply for the aerobic treatment process is supplied as diffused aeration by three radial blowers each powered by 250 H.P. constant speed electric motors. Variable air supply is maintained by throttling valves on intake side of each blower and/or phasing in and out Blowers No. 1, 2 and 3. This combination allowed for varying air supply from 5,500 CFM to 18,000 CFM and varying horsepower from 250 to 750.

By practicing the invention the alkalinity levels at comparative pH end points of filtered and unfiltered samples are indicated by Table III:

TABLE III

| Monitoring Location | Time Sample Taken | Initial pH | Alkalinity Level (ppm) At Selected End Point | | | |
|---|---|---|---|---|---|---|
| | | | @ 6.00 pH | @ 5.75 pH | @ 5.5 pH | @ 4.5 pH |
| Raw | 7:30AM | 6.89 | 185 ppm | 225 ppm | 249 ppm | 335 ppm |
| Effluent | 7:30AM | 7.21 | 171 ppm | 204 ppm | 233 ppm | 270 ppm |
| Digester (Filtered) | 7:30AM | 7.18 | 95 ppm | 113 ppm | 125 ppm | 149 ppm |
| Digester (Unfiltered) | 7:30AM | 7.05 | 126 ppm | 161 ppm | 191 ppm | 303 ppm |
| Contact Tank | 7:30AM | 7.14 | 236 ppm | 160 ppm | 248 ppm | 321 ppm |
| Re-aeration Tank | 7:30AM | 7.00 | 174 ppm | 210 ppm | 248 ppm | 330 ppm |
| Raw | 10:30PM | 6.93 | 195 ppm | 209 ppm | 256 ppm | 364 ppm |
| Effluent | 10:30PM | 7.22 | 169 ppm | 170 ppm | 227 ppm | 287 ppm |
| Digester (Filtered) | 10:30PM | 6.79 | 70 ppm | 115 ppm | 125 ppm | 148 ppm |
| Digester (Unfiltered) | 10:30PM | 6.97 | 98 ppm | 138 ppm | 164 ppm | 317 ppm |
| Contact Tank | 10:30PM | 7.02 | 163 ppm | 217 ppm | 253 ppm | 341 ppm |
| Re-aeration Tank | 10:30PM | 6.82 | 135 ppm | 194 ppm | 234 ppm | 351 ppm |

By practicing the invention, process control changes could be implemented before the fact rather than after the fact, giving the operator a positive tool for process control. The alkalinity levels changed much more quickly and predictedly than pH levels and do not rely on dissolved oxygen content, something more difficult to sense. It was possible by sensing at the six points indicated after establishing the influent point base line, to maintain alkalinity levels within the range desired (see FIG. 4) and thereby to reduce power costs, improve effluent quality, improve settling and decanting, and increase sludge concentration in the digester. Thus, operating costs and odor control problems were reduced while insuring effluent quality.

It will thus be seen that according to the present invention a method and apparatus are provided for the effective control of an aerobic wastewater treatment process. While the invention has been herein shown and described as what is presently conceived to be the most practical and preferred embodiment it will be apparent to those of ordinary skill in the art that many modifications made be made thereof within the scope of the invention, which scope is to be accorded the broadest interpretation of the appended claims so as to encompass all the equivalent methods and apparatus.

WHAT IS CLAIMED IS:

1. A method of controlling an aerobic wastewater treatment process, having an influent of wastewater to the process and an effluent of treated water from the process, comprising the steps of:

(a) determining a base line of alkalinity by measuring the alkalinity profile of the influent wastewater to the aerobic wastewater treatment process;

(b) sensing the alkalinity of the wastewater being treated at a plurality of different points in the aerobic wastewater treatment process;

(c) when the sensed alkalinity from step (b) is above a predetermined amount over base line alkalinity, and on the basis of the alkalinity sensing alone, independent of dissolved oxygen sensing, increasing air supply and/or reducing concentration of microbes and food until the sensed alkalinity level is within a predetermined amount over base line; and (d) when the sensed alkalinity from step (b) is below a predetermined amount under base line alkalinity, and on the basis of the alkalinity sensing alone, independent of dissolved oxygen sensing, decreasing air supply and/or increasing the concentration of food and microbes, until the sensed alkalinity level is within a predetermined amount under base line;

(e) whereby efficient treatment of wastewater to produce treated effluent without the addition of outside alkalinity adjusting chemicals or additives is accomplished.

2. A method as recited in claim 1 wherein the aerobic treatment process utilizes a primary clarifier, and wherein step (b) is practiced to sense the primary clarifier effluent and sludge exit and wherein step (c) is practiced to increase the sludge withdrawal rate from the primary clarifier, and step (d) is practiced to reduce or stop the sludge withdrawal rate, until alkalinity stabilizes.

3. A method as recited in claim 2 wherein step (c) is practiced to increase sludge withdrawal rate when the alkalinity level at either the sensed primary clarifier effluent or sludge exit is about 15 mg $CaCO_3$/L or more over baseline alkalinity, and step (d) is practiced to reduce or stop the sludge withdrawal rate when the alkalinity level of either the primary clarifier effluent or sludge is about 10 mg/L or less under base line alkalinity.

4. A method as recited in claim 2 wherein the aerobic treatment process utilizes a secondary clarifier, and wherein step (b) is practiced to sense the secondary clarifier effluent and sludge, and wherein step (c) is practiced to increase the sludge withdrawl rate from the secondary clarifier, and step (d) is practiced to reduce or stop the sludge withdrawal rate from the secondary clarifier, until alkalintiy stabilizes.

5. A method as recited in claim 4 wherein step (c) is practiced to increase sludge withdrawl rate when the alkalintiy level at the sensed secondary clarifier effluent is about 15 mg/L or more over base line alkalinity, or is about 30 mg/L or more over base line alkalinity at the secondary clarifier sludge withdrawl; and wherein step (d) is practiced to reduce the sludge withdrawl rate when the alkalinity level at either the sensed secondary clarifier effluent or sludge exit is about 10 mg/L or less under base line alkalinity.

6. A method as recited in claim 1 wherein steps (c) and (d) are practiced to change oxygen addition and/or the concentration and feed of microbes when the change in alkalintiy compared to base line is about 100 mg $CaCO_3$/L or less.

7. A method as recited in claim 1 wherein the aerobic treatment process includes a clarifier, an aeration zone, and an aerobic digester, and wherein step (b) is practiced to sense alkalinity at, or at the influent to and/or effluent from, each of the clarifier, aeration zone, and digester.

8. A method as recited in claim 7 wherein step (b) is provided to sense alkalinity at a first point about 30% of aeration zone length or time and a second point about 100% of aeration zone length or time.

9. A method as recited in claim 1 when the aerobic treatment process utilizes an aerobic zone, and wherein step (c) is practiced so as to increase the air supply and/or reduce the MLSS concentration, and wherein step (d) is practiced to reduce the air supply and/or increase the MLSS.

10. A method as recited in claim 9 wherein step (b) is practiced at two different points in the aeration zone, one at approximately 30% of the aeration zone length or time, and the other at approximately 100% the aeration zone length or time.

11. A method as recited in claim 10 wherein at approximately 30% of the aeration zone length or time, step (c) is practiced when the alkalinity reaches +10 mg/L relative to base line, and step (d) when the alkalinity level reaches −20 mg/L relative to base line; and wherein at approximately 100% point of the aeration zone, step (c) is practiced when the alkalinity level reaches +10 mg/L relative to base line, and step (d) is practiced when the alkalinity level reaches about −60 mg/L relative to base line.

12. A method as recited in claim 1 wherein the aerobic wastewater treatment process includes an aerobic digester; and wherein step (b) is practiced to sense the aerobic digester effluent, and wherein step (c) is practiced to supply air to the digester, and step (d) is practiced to terminate the supply of air to the digester.

13. A method as recited in claim 12 wherein step (c) is practiced whenever the sensed digester effluent is about 100 mg $CaCO_3$/L or more over base line alkalinity, and step (d) is practiced whenever the digester effluent is about 100 mg/L or more under base line alkalinity.

14. A method as recited in claim 1 wherein steps (c) and (d) are practiced by controlling valves and/or pumps.

15. In the aerobic treatment of wastewater in which oxygen is supplied to microbes and feed, a method of monitoring alkalinity within a predetermined range so as to maintain the pH of the wastewater between about 6.5–8.0 during treatment, utilizing different treatment zones, predetermined treatment steps being practiced in the zones, by practicing the steps of:

(a) sensing the alkalinity of the wastewater, independent of dissolved oxygen sensing, in each of a plurality of different treatment zones, and each of a plurality of points including one point in each zone, in the aerobic treatment of wastewater; and (b) in response only to the sensing from step (a), adjusting the alkalinity adjacent the plurality of points so that it is within the 100 mg of $CaCO_3$/L of a desired value by changing the rate of oxygen supply and/or the concentration of microbes and feed, so as to control alkalinity to maintain pH within the range of about 6.5–8.0 without the addition of chemicals or additives.

16. In the method of claim 15, practicing step (b) so as to maintain the pH of the wastewater within the range of about 6.7–7.3.

17. In the method of claim 15, practicing the further step (c) of determining the base line alkalinity at the influent to the aerobic treatment process, and wherein the desired value in step (b) is the so-determined base line.

* * * * *